(12) United States Patent
Minakuchi et al.

(10) Patent No.: US 10,659,956 B1
(45) Date of Patent: May 19, 2020

(54) CONTRACT ASSIGNMENT SWITCHING APPARATUS, SYSTEM AND METHOD

(71) Applicant: FUJITSU LIMITED, Kawasaki-shi, Kanagawa (JP)

(72) Inventors: Yu Minakuchi, Yokohama (JP); Hideyuki Matsuda, Atsugi (JP); Jo Sugino, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/684,846

(22) Filed: Nov. 15, 2019

(30) Foreign Application Priority Data

Dec. 14, 2018 (JP) ................................ 2018-234670

(51) Int. Cl.
*H04M 3/00* (2006.01)
*H04W 8/18* (2009.01)
*H04W 8/20* (2009.01)
*G06Q 10/10* (2012.01)

(52) U.S. Cl.
CPC .......... *H04W 8/183* (2013.01); *G06Q 10/105* (2013.01); *H04W 8/205* (2013.01)

(58) Field of Classification Search
CPC ..... H04W 8/183; H04W 8/205; G06Q 10/105
USPC ........................................................ 455/419
See application file for complete search history.

(56) References Cited

U.S. PATENT DOCUMENTS

| 9,883,041 B2* | 1/2018 | Kim ................. H04M 1/7253 |
| 10,212,558 B2* | 2/2019 | Periyalwar ........... H04W 48/18 |
| 10,334,427 B2* | 6/2019 | Yang ..................... H04W 8/183 |
| 10,382,919 B2* | 8/2019 | Karimli ................ H04L 9/3213 |

FOREIGN PATENT DOCUMENTS

| JP | 2007-336366 | 12/2007 |
| JP | 2012-209730 | 10/2012 |

* cited by examiner

*Primary Examiner* — Amancio Gonzalez
(74) *Attorney, Agent, or Firm* — Fujitsu Patent Center

(57) ABSTRACT

A contract assignment switching apparatus includes a memory and a processor configured to send a notification to switch an assignment of identification information corresponding to one contract for communication through a telephone network, at a switching time of the assignment of the identification information, to a first terminal device to which the identification information is assigned before the switching time and a second terminal device to which the identification information is assigned after the switching time, and request the first terminal device and the second terminal device to rewrite information with respect to the contract stored in the first terminal device and the second terminal device respectively so as to switch the assignment of the identification information from the first terminal device to the second terminal device in accordance with a response to the notification from each of the first terminal device and the second terminal device.

8 Claims, 13 Drawing Sheets

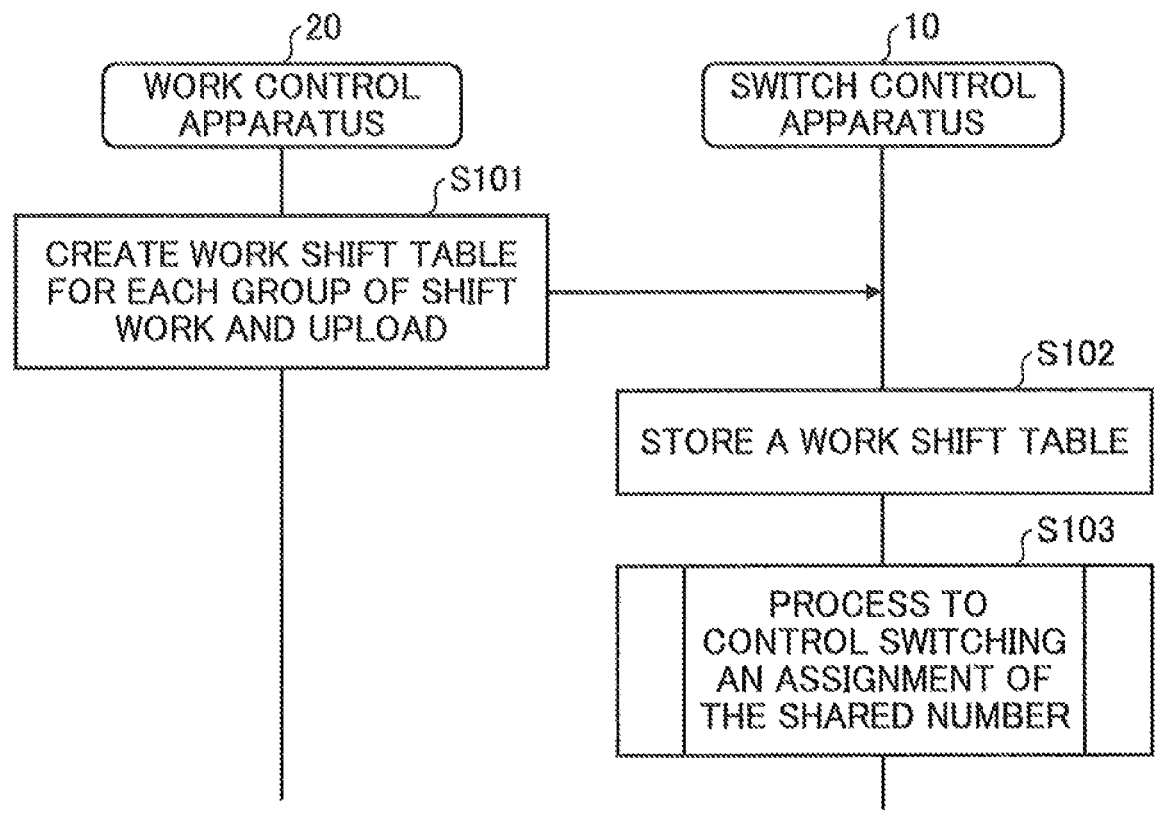

FIG.9

| IDENTIFICATION NUMBER OF SIM CARD |
| MOBILE PHONE NUMBER INFORMATION |
| COUNTRY AND CARRIER CODE |

FIG.14

| SECTION | DATE AND TIME |
|---|---|
| : | : |
| EXIT | 2018/8/17 0:05 |
| ENTRY | 2018/8/17 11:55 |

35

CONTRACT ASSIGNMENT SWITCHING APPARATUS, SYSTEM AND METHOD

CROSS-REFERENCE TO RELATED APPLICATIONS

The present application is based upon and claims the benefit of priority from the prior Japanese Patent Application No. 201.8-234670 filed on Dec. 14, 2018, with the Japanese Patent Office, the entire contents of which are incorporated herein by reference.

FIELD

The disclosures herein relate to a contract assignment switching apparatus, system and method.

BACKGROUND

A company which provides mobile devices to employees for business purposes makes a contract with a mobile carrier for each mobile device (i.e., each employee).

Shift work by a plurality of employees is normally used to provide a service to answer users' questions for 24 hours a day, for example. Although the employees of the shift work do not use the mobile devices at the same time, as many contracts with the mobile carrier as the number of mobile devices are required.

RELATED-ART DOCUMENTS

Patent Document

[Patent Document 1] Japanese Laid-Open Patent Publication No. 2012-209730
[Patent Document 2] Japanese Laid-Open Patent Publication No. 2007-336366

SUMMARY

According to an aspect of the embodiment, a contract assignment switching apparatus includes a memory and a processor coupled to the memory and configured to send a notification to switch an assignment of identification information corresponding to one contract for communication through a telephone network, at a switching time of the assignment of the identification information, to a first terminal device to which the identification information is assigned before the switching time and a second terminal device to which the identification information is assigned after the switching time, and request the first terminal device and the second terminal device to rewrite information with respect to the contract stored in the first terminal device and the second terminal device respectively so as to switch the assignment of the identification information from the first terminal device to the second terminal device in accordance with a response to the notification from each of the first terminal device and the second terminal device.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 6 is a flowchart describing an example of an uploading procedure of a work shift table;

FIG. 7 is a drawing illustrating an example of the configuration of the work shift table;

FIG. 9 is a drawing illustrating an example of the configuration of contract information;

FIG. 14 is a drawing illustrating an example of the configuration of a recording unit for entry and exit history.

DESCRIPTION OF EMBODIMENTS

Figure 1:
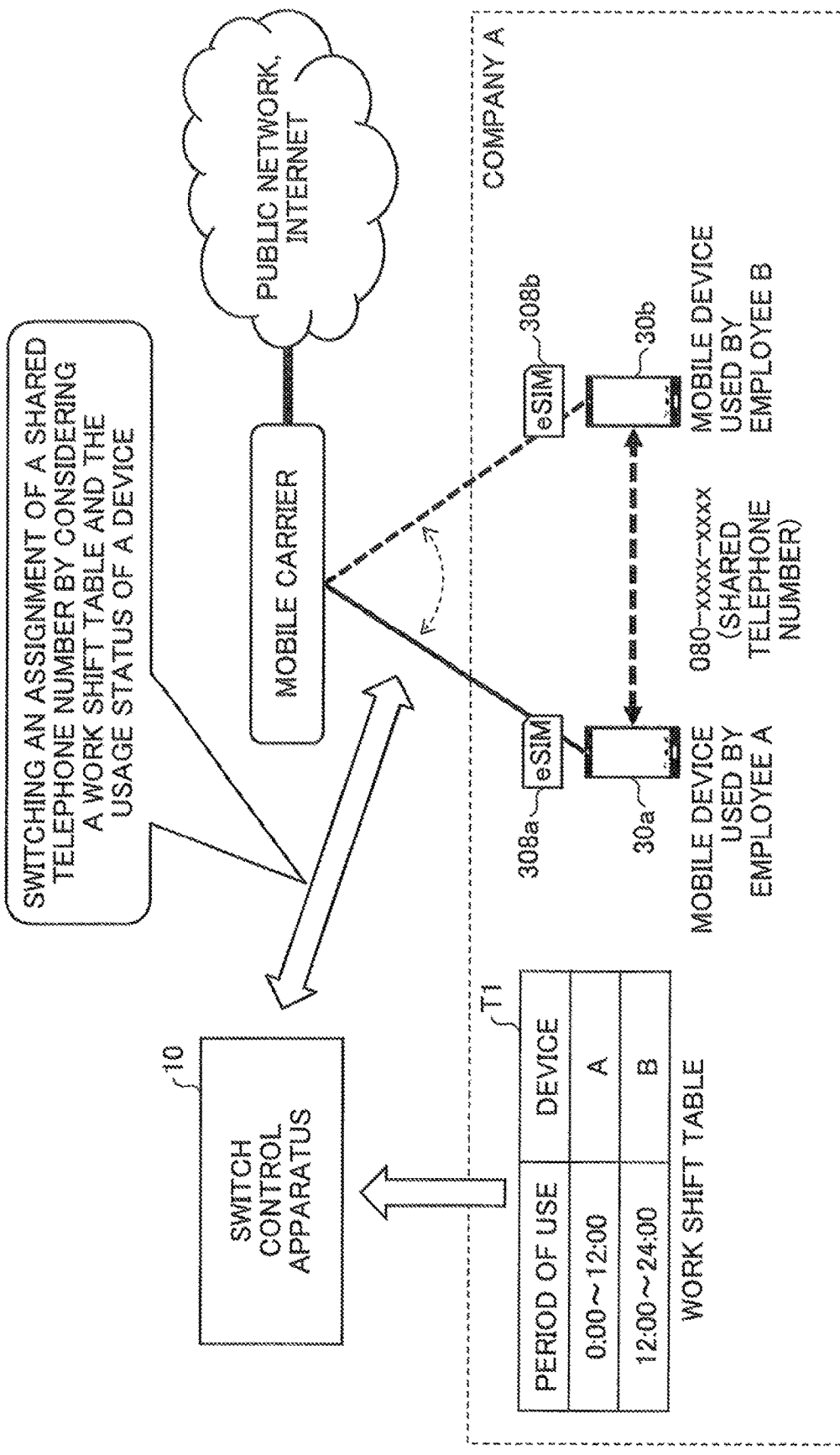
FIG. 1 is a drawing illustrating an overview of a first embodiment.

In the following, embodiments of the present invention will be described with reference to the accompanying drawings. FIG. 1 is a drawing illustrating an overview of a first embodiment.

According to the embodiment illustrated in FIG. 1, each mobile device used by an organization such as a company (i.e., Company A in FIG. 1) is equipped with an eSIM 308a or eSIM 308b (which will hereinafter be referred to as the eSIM 308 when eSIM 308a and eSIM 308b are not distinguished). The mobile devices in FIG. 1 include a mobile device 30a used by Employee A and a mobile device 30b used by Employee B. The eSIM 308 is so called eSIM (Embedded Subscriber Identity Module) and stores information about a contract with a mobile carrier for communication through a telephone network (which will hereinafter be referred to as the contract information), especially a mobile communication network. The contract information in the eSIM 308 can be rewritten from an external device. The contract information includes identification information of each contract such as a telephone number.

A work shift table T1 is defined in Company A. A plurality of the mobile devices share one telephone number based on one contract between the mobile carrier and Company A, and the work shift table T1 defines the boundaries of time periods in which the telephone number is assigned to the respective mobile devices. A switching control apparatus 10 rewrites the contract information in the eSIM 308 of each mobile device based on the work shift table T1. According to an example of FIG. 1, 0:00 (24:00) and 12:00 are switching times. The telephone number is assigned to the mobile device 30b before 0:00, and is assigned to the mobile device 30a after 0:00. At 0:00 (24:00), the switching control apparatus 10 requests the mobile device 30b (i.e., the mobile device to which the telephone number is already assigned) and the mobile device 30a (i.e., the mobile device to which the telephone number will be assigned) to rewrite the contract information stored in their eSIMs 308 so as to cause the telephone number to be released from the mobile device 30b and to be assigned to the mobile device 30a. At 12:00, the switching control apparatus 10 requests the mobile device 30a and the mobile device 30b to rewrite the contract information stored in their eSIM 308 so as to switch the telephone number assignment. However, the switching control apparatus 10 rewrites the contract information in the eSIM 308 of each mobile device only when allowed by a state of each mobile device. Thus, switching timing of the mobile devices which use a shared telephone number (i.e., the mobile devices to which the shared telephone number is assigned) is adjusted based on the state of each mobile device. A forced switch of the shared telephone number assignment can be avoided at an inappropriate timing, for example, when at least one of the mobile devices is engaged in a call.

Figure 2:
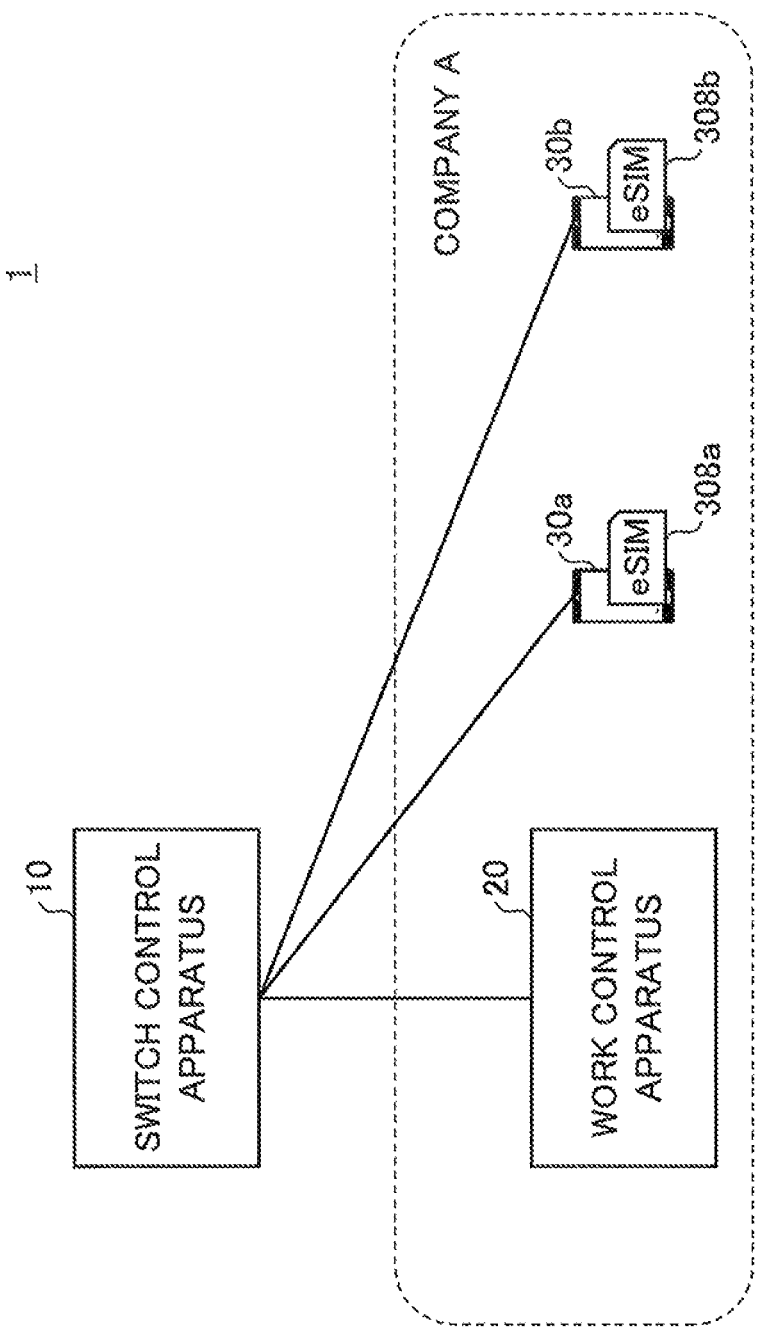
FIG. 2 is a drawing illustrating an example of the configuration of a switching control system according to the first embodiment.

FIG. 2 is a drawing illustrating an example of the configuration of a switching control system according to the first embodiment. The switching control system in FIG. 2 includes the switching control apparatus 10, a work control apparatus 20, and a plurality of mobile devices such as the mobile device 30a and the mobile device 30b (which will hereinafter be referred to as the mobile devices 30 when each of the mobile devices is not distinguished). Company A has the work control apparatus 20 and the mobile devices 30, and each of the mobile devices 30 is lent to an employee of Company A. The switching control apparatus 10 is managed by another organization different from Company A. For example, the switching control apparatus 10 may be managed by a carrier who provides the eSIM 308 installed in each of the mobile devices 30. Alternatively, the switching control apparatus 10 may be managed by Company A. In this case, the work control apparatus 20 may also take a role of the switching control apparatus 10.

The work control apparatus 20 is one or more computers which receive data of the work shift table T1 of Company A and send (or upload) the work shift table T1 to the switching control apparatus 10.

The switching control apparatus 10 is one or more computers which provide a service to control switching an assignment of the shared (i.e., same) telephone number to the mobile devices 30 based on the work shift table T1 uploaded from the work control apparatus 20 of Company A or the like.

Each of the mobile devices 30 is a communication terminal which can communicate (i.e., talk) over a telephone network, such as a mobile phone, a smartphone, and a tablet. Each of the mobile devices 30 can be used for shift work to answer questions from customers of Company A, for example. Each of the mobile devices 30 in FIG. 2 is equipped with the eSIM 308 which can be rewritten from an external device.

The work control apparatus 20 and the switching control apparatus 10 can communicate with each other through a network such as LAN (Local Area Network) and Internet. Each of the mobile devices 30 can communicate with the switching control apparatus 10 through a mobile communication network or the like.

Figure 3:
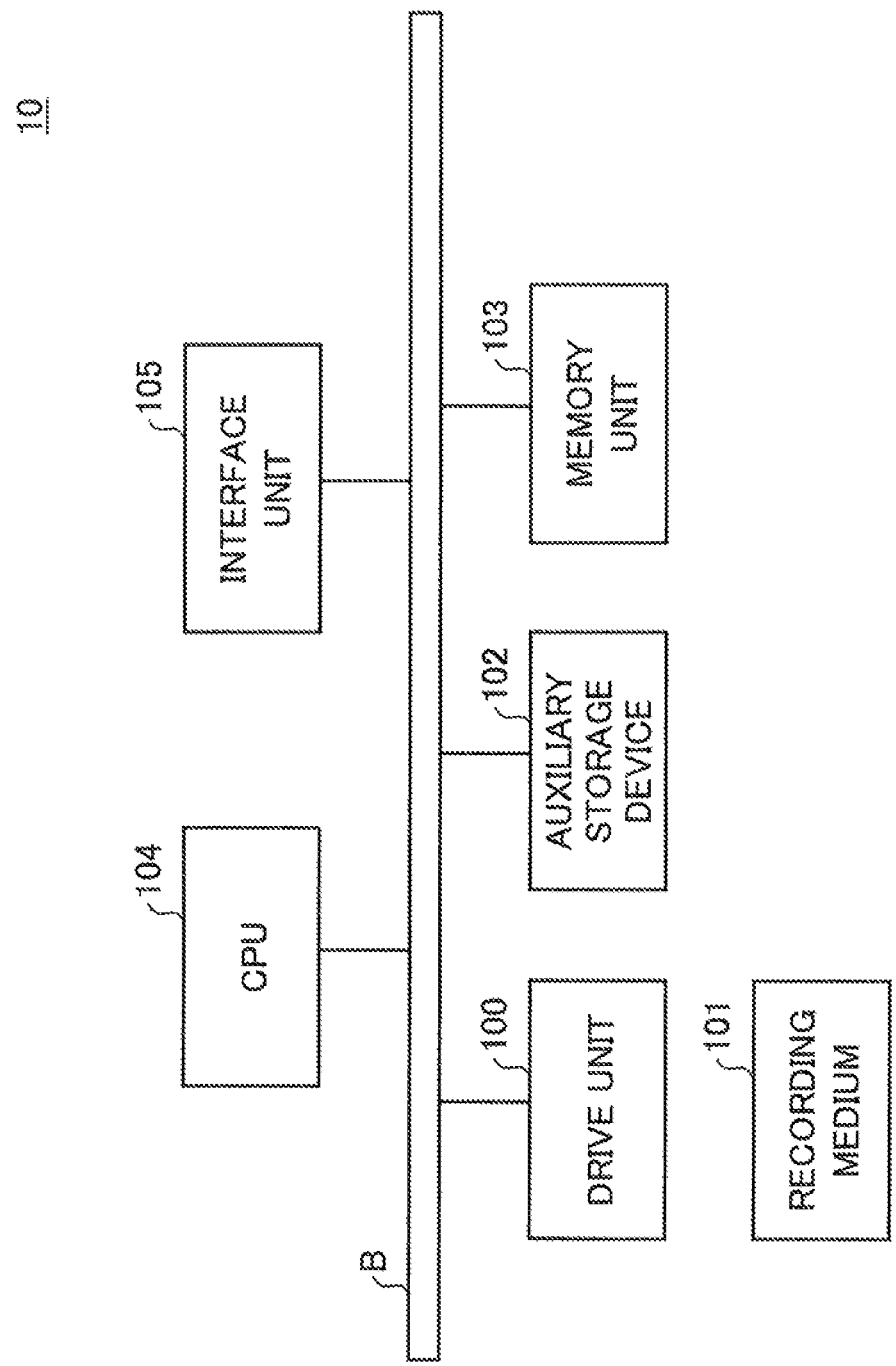
FIG. 3 is a drawing illustrating an example of the hardware configuration of a switching control apparatus according to the first embodiment.

FIG. 3 is a drawing illustrating an example of the hardware configuration of the switching control apparatus 10 according to the first embodiment. The switching control apparatus 10 in FIG. 3 includes a drive unit 100, an auxiliary storage device 102, a memory unit 103, a CPU 104, and an interface unit 105 which are connected through a bus B.

A recording medium 101 provides a program which implements processing of the switching control apparatus 10. The program is installed into the auxiliary storage device 102 from the recording medium 101 by the drive unit 100 when the recording medium with the program is set in the drive unit 100. However, it is not necessary to install the program from the recording medium 101 and the program can be installed from another computer by downloading the program through a network. The auxiliary storage device 102 stores the installed program and necessary files, data, and the like.

The program is loaded from the auxiliary storage device 102 into the memory unit 103 when the program start is instructed. The CPU 104 executes the function of the switching control apparatus 10 based on the program stored in the memory unit 103. The interface unit 105 is used as an interface to connect to a network.

Examples of the recording medium 101 are CD-ROM, DVD, USB flash drive, and the like. The examples of the auxiliary storage device 102 are HD (Hard Disk Drive), flash memory, and the like. The recording medium 101 and the auxiliary storage device 102 are computer readable storages.

Figure 4:
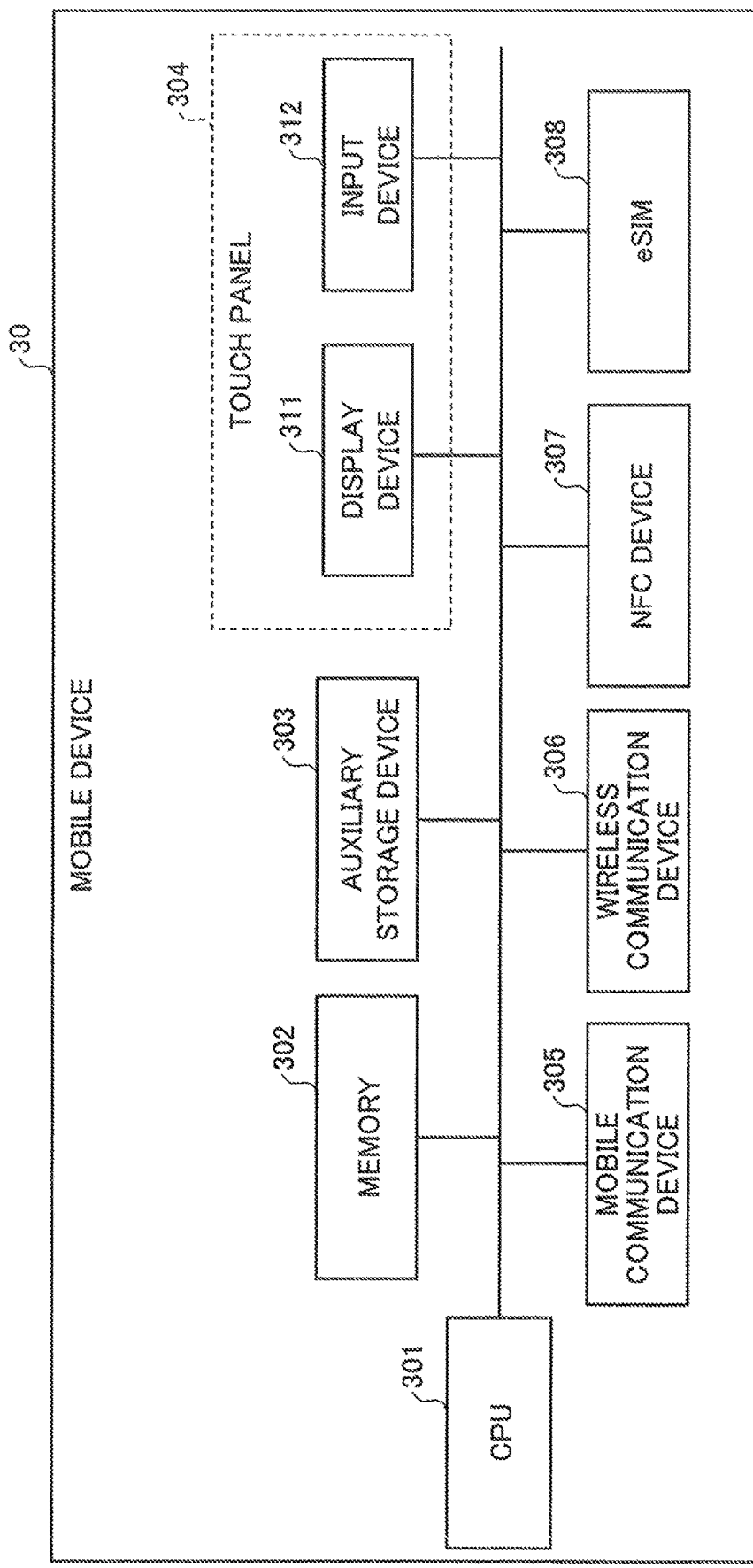
FIG. 4 is a drawing illustrating an example of the hardware configuration of a mobile device according to the first embodiment.

FIG. 4 is a drawing illustrating an example of the hardware configuration of the mobile device 30 according to the first embodiment. The mobile device 30 in FIG. 4 includes a CPU 301, a memory 302, an auxiliary storage device 303, a touch panel 304, a mobile communication device 305, a wireless communication device 306, an NFC device 307, and the eSIM 308.

The program installed in the mobile device 30 and the like are stored in the auxiliary storage device 303. The program is loaded from the auxiliary storage device 303 into the memory 302 when the program start is instructed. The CPU 301 achieves the function of the mobile device 30 by performing the program stored in the memory 302.

The touch panel 304 is an electric component with an input function and a display function. The touch panel 304 displays information and accepts an input from users or the like. The touch panel 304 includes a display device 311 and an input device 312.

The display device 311 is a liquid crystal display or the like and provides a display function of the touch panel 304. The input device 312 is an electric component with a sensor to detect a contact of a contact object to the display device 311. The detection system of a contact of a contact object may be any publicly known system such as a capacitive system, a resistive film system, or an optical system. The contact object is an object which contacts a contact face (i.e., a surface) of the touch panel 304. The examples of the contact object are a user's finger and a special or general pen.

The mobile communication device 305 controls mobile communication based on the contract information stored in the eSIM 308. The wireless communication device 306 controls wireless communication such as Bluetooth (registered mark) or Wi-Fi (registered trademark). The NFC device 307 controls communication by an NFC (Near field communication). The eSIM 308 is the module as described above.

Figure 5:
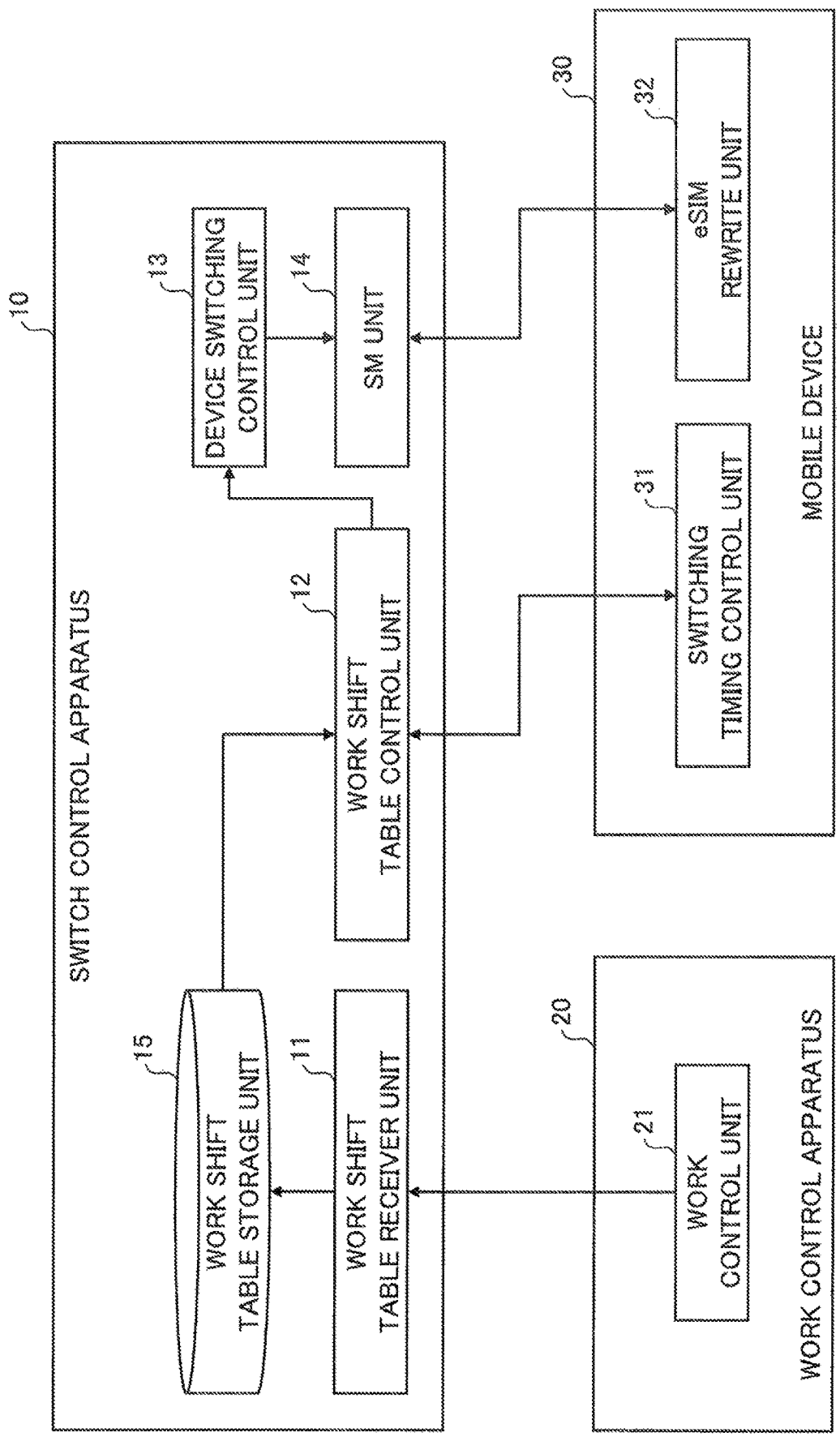
FIG. 5 is a drawing illustrating an example of the functional configuration of the switching control system according to the first embodiment.

FIG. 5 is a drawing illustrating an example of the functional configuration of the switching control system according to the first embodiment. The work control apparatus 20 in FIG. 5 includes a work control unit 21. The work control unit 21 is implemented by the process of one or more programs, installed in the work control apparatus 20, executed by the CPU in the work control apparatus 20. The work control unit 21 receives data of the work shift table T1 and sends (or uploads) the work shift table T1 to the switching control apparatus 10.

The switching control apparatus 10 includes a work shift table receiver unit 11, a work shift table control unit 12, a terminal device switching control unit 13, and an SM unit 14. Each unit is implemented by the process of one or more programs, installed in the switching control apparatus 10, executed by the CPU 104 in the switching control apparatus 10. The switching control apparatus 10 uses a work shift table storage unit 15. For example, the work shift table storage unit 15 can be achieved by the auxiliary storage device 102 or a storage device connected to the switching control apparatus 10 through a network.

The work shift table receiver unit 11 receives the work shift table T1 uploaded from the work control apparatus 20 and stores the work shift table T1 in the work shift table storage unit 15.

With respect to a telephone number shared by a plurality of the mobile devices 30 (which will hereinafter be referred to as the shared number), the work shift table control unit 12 sends a notification about switching the assignment of the shared number (which will hereinafter be referred to the terminal device switching notification) at the switching time of the work shift table T1 to the mobile device 30 to which the shared number has been assigned (i.e., the mobile device 30 from which the shared number assignment is switched) and the mobile device 30 to which the shared number will be assigned (i.e., the mobile device 30 to which the shared number assignment is switched).

The terminal device switching control unit 13 instructs the SM unit 14 to switch the assignment of the shared number in accordance with the response, from each of the mobile devices 30, to the terminal device switching notification.

The SM unit 14 functions as SM (Subscription Manager). The SM unit 14 sends a request of rewriting the contract information in the eSIM 308 of the mobile device 30 to each of the mobile devices 30 in accordance with an instruction from the terminal device switching control unit 13 in order to switch the assignment of the shared number.

According to the embodiment, a mobile communication network is used for communication between the switching control apparatus 10 and each of the mobile devices 30. In this case, a given mobile device 30 is required to communicate with the switching control apparatus 10 even if the shared number is not assigned to this mobile device 30. When a mobile communication network cannot be used by the mobile device 30 to which the shared number is not assigned, the communication between the switching control apparatus 10 and the mobile device 30 may be achieved by another network such as a wireless network which may be Wi-Fi (registered trademark).

The mobile device 30 includes a switching timing control unit 31 and an eSIM rewrite unit 32. Each unit is implemented by the process of one or more programs, installed in the mobile device 30, executed by the CPU 301 in the mobile device 30.

The switching timing control, unit 31 asks a user whether the shared number assignment can be switched when the switching timing control unit 31 receives the terminal device switching notification from the switching control apparatus 10. After an input by a user indicating that the shared number can be switched, the switching timing control unit 31 sends a response indicating that the shared number assignment can be switched (i.e., Ack) to the switching control apparatus 10.

The eSIM rewrite unit 32 rewrites the contract information stored in the eSIM 308 in response to the rewrite request from the switching control apparatus 10.

In the following, a procedure performed in the switching control system 1 will be described. FIG. 6 is a flowchart describing an example of the uploading procedure of a work shift table.

In step S101, the work control unit 21 creates a work shift table T1 for each group for performing shift work (which will hereinafter be referred to as the shift work group) based on an input from an administrator of the shift work in Company A, for example, and uploads the work shift table T1 to the switching control apparatus 10.

FIG. 7 is a drawing illustrating an example of the configuration of the work shift table T1. As illustrated in FIG. 7, the work shift table T1 includes a shift work group ID, an assignment period, and device information of the shared number assignment, for each shift work group. The shift work group ID is identification information for the shift work group. According to the embodiment, the telephone number shared by the shift work group (the shared number) is used as the shift work group ID. The assignment period is a period of time in which the shared number is assigned to each of the mobile devices 30 of the shift work group. Each assignment period is determined without any overlapping. Thus, the boundaries of assignment periods are examples of information indicative of the switching timing at which the shared number assignment switches between the mobile devices 30. The terminal device information of the shared number assignment is identification information of the mobile device 30 to which the shared number is assigned (which will hereinafter be referred to as the terminal device ID). In the present embodiment, the terminal device ID of the mobile device 30a is "A", and the terminal device ID of the mobile device 30b is "B".

In step S102, the work shift table receiver unit 11 of the switching control apparatus 10 receives the work shift table T1 and stores the work shift table T1 in the work shift table storage unit 15.

In step S103, the switching control apparatus 10 starts a process to control switching the assignment of the shared number based on the work shift table T1 (which will hereinafter be referred to as the assignment switching control process).

Figure 8:
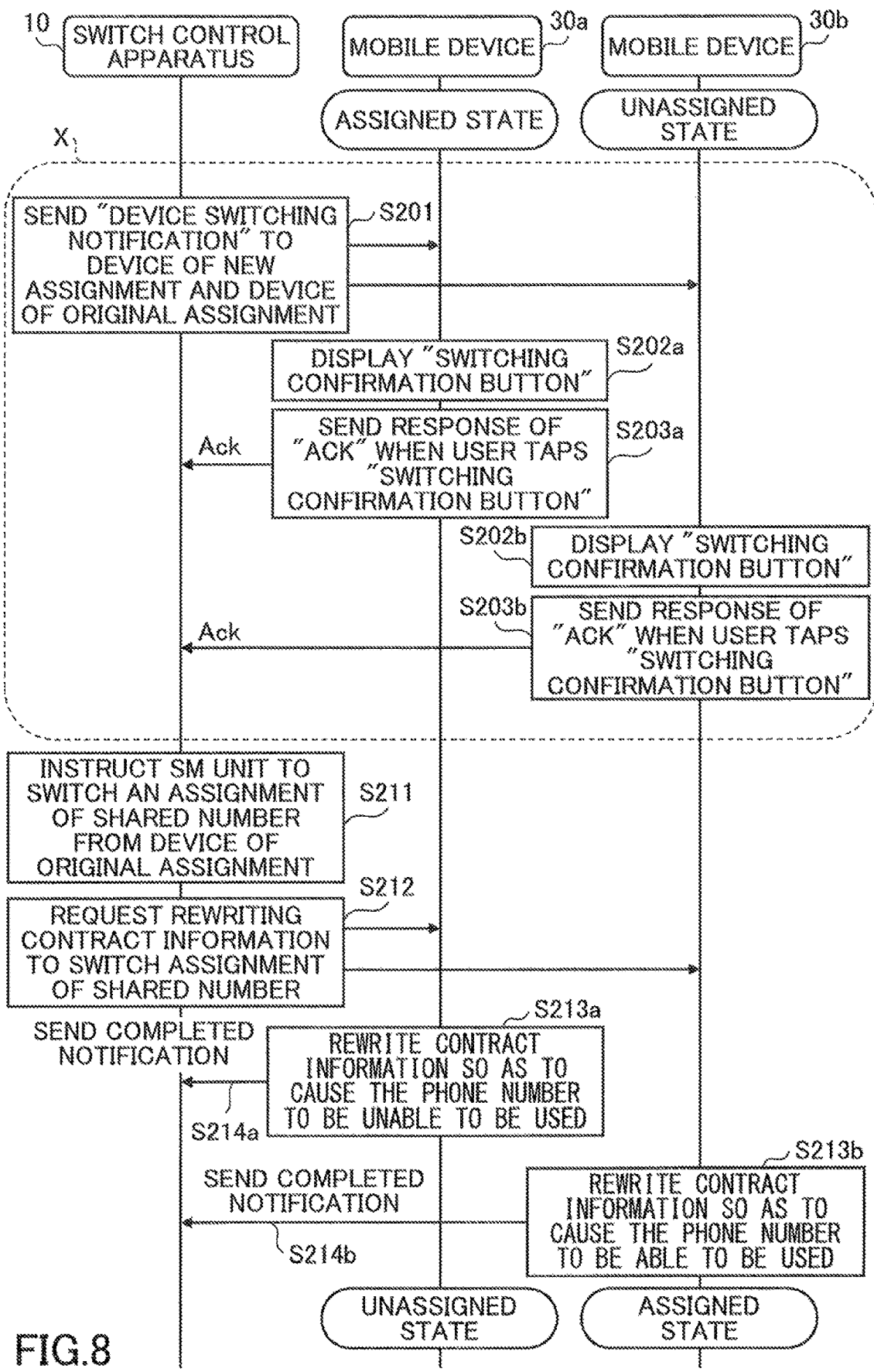
FIG. 8 is a sequence diagram describing an example of an assignment switching control process according to the first embodiment.

Next, the details of step S103 will be described. FIG. 8 is a sequence diagram describing an example of the assignment switching control process according to the first embodiment. At the beginning of a process in FIG. 8, the mobile device 30a is in such a state that the shared number is assigned (i.e., an assigned state) and the mobile device 30b is in such a state that the shared number is not assigned (i.e., an unassigned state).

The work shift table control unit 12 waits until the switching time of the shared number assignment comes for each shift work group ID. According to an example in FIG. 7, when 12:00 comes, the work shift table control unit 12 sends the terminal device switching notification to the mobile device 30a to which the shared number has been assigned (i.e., the mobile device 30 from which the shared number assignment is switched) and the mobile device 30b to which the shared number will be assigned (i.e., the mobile device 30 to which the shared number assignment is switched) in step S201.

In step S202a and S202b, each of the switching timing control units 31 in the mobile device 30a and 30b displays "Switching Confirmation Button" to ask a user whether the shared number assignment can be switched when the terminal device switching notification is received. Each user of the mobile devices 30 taps or pushes "Switching Confirmation Button" when the shared number assignment can be switched. Specifically, the user of the mobile device 30a (i.e., User A) taps "Switching Confirmation Button" when User A is not speaking on the mobile device 30a or the mobile device 30a is not receiving a call, for example. The user of the mobile device 30b (i.e., User B) taps "Switching Confirmation Button" when User B is ready for starting the shift work.

In step S203a and S203b, the switching timing control unit 31 in each of the mobile devices 30 sends a response indicating that the shared number can be switched (i.e., Ack) to the switching control apparatus 10 when "Switching Confirmation Button" is tapped (i.e., when an input indicating that the shared number can be switched is received). In other words, each of the mobile devices 30 does not send an Ack without "Switching Confirmation Button" tapped.

The switching control apparatus 10 performs processes in step S211 and onward after the switching control apparatus 10 receives an Ack from all the mobile devices 30 to which the terminal device switching notifications are sent (i.e., the mobile device 30a and the mobile device 30b). The switching control apparatus 10 does not perform the processes in step S211 and onward when the switching control apparatus 10 does not receive an Ack from at least one of the mobile device 30a and the mobile device 30b.

In step S211, the terminal device switching control unit 13 of the switching control apparatus 10 instructs the SM unit 14 to switch the assignment of the shared number from the terminal device of an original assignment (i.e., the mobile device 30a) to the terminal device of a new assignment (i.e., the mobile device 30b). At this time, the SM unit 14 receives the shared number, the terminal device ID of the mobile device 30a from which the shared number is released, and the terminal device ID of the mobile device 30b to which the shared number is assigned.

In step S212, the SM unit 14 sends a request of rewriting the contract information in the eSIM 308 to the mobile device 30a of the original assignment so as to cause the shared number to be released (i.e., to be disabled), and the SM unit 14 sends a request of rewriting the contract information in the eSIM 308 to the mobile device 30b of the new assignment so as to cause the shared number to be assigned (i.e., to be enabled). The rewrite request to the mobile device 30b may include the shared number.

In step S213a and S213b, each eSIM rewrite unit 32 of the mobile device 30a and mobile device 30b rewrites (or changes) the contract information stored in its eSIM 308 based on the received rewrite request.

FIG. 9 is a drawing illustrating an example of the configuration of the contract information. As illustrated in FIG. 9, the contract information includes an identification number of a SIM card, mobile phone number information, and a country and carrier code. The identification number of SIM card is identification information of each eSIM 308. The mobile phone number information is the phone number assigned to the mobile device 30. The country and carrier code is an identification number which is issued for a subscriber of the mobile device 30.

With respect to the present embodiment, a description will be given of an example in which an availability of the shared number is switched by rewriting the mobile telephone number information. In step S213a, the eSIM rewrite unit 32 of the mobile device 30a deletes the mobile telephone number information (i.e., the shared number) of the contract information stored in the eSIM 308 of the mobile device 30a. In step S213b, the eSIM rewrite unit 32 of the mobile device 30b writes the shared number to the mobile telephone number information of the contract information stored in the eSIM 308 of the mobile device 30b. As a result, the mobile device 30a cannot be used to make and receive a call with the shared number, and the mobile device 30b can be used to make and receive a call with the shared number.

The availability of the shared number can be switched by another way different from the above. For example, when the mobile device 30 with an invalid value of the country and carrier code cannot be used to communicate, the assignment of the shared number can be switched by rewriting the country and carrier code. Thus, a method of rewriting the contract information of the eSIM 308 is not limited to a specific method as long as a method does not allow the mobile device 30a from which the shared number is released to use the shared number.

In step S214a and S214b, each eSIM rewrite unit 32 of the mobile device 30a and the mobile device 30b sends a completed notification to the switching control apparatus 10 when rewriting the contract information is completed.

Through the procedure described above, the mobile device 30a is placed in the unassigned state and the mobile device 30b is placed in the assigned state.

As described above, according to the first embodiment, a plurality of the mobile devices 30 can be used to make and receive a call with the shared number in different periods of time. As a result, the number of contracts with the mobile carrier can be decreased by using the shared number for a plurality of the mobile devices 30 which are not used at the same time. Consequently, contracts to communicate through a telephone network can be used efficiently.

At the switching time, the switching control apparatus 10 sends the terminal device switching notification to both the mobile device 30 of the original assignment and the mobile device 30 of the new assignment when the shared number is used among a plurality of the mobile devices 30 by switching an assignment based on a schedule of the work shift table T1. These mobile devices 30 ask users whether the shared number assignment can be switched in accordance with the terminal device switching notification. Each of the mobile devices 30 sends a response to the terminal device switching notification to the switching control apparatus 10 after an input by a user indicating that the shared number can be switched. The switching control apparatus 10 requests the mobile device 30 of the original assignment and the mobile device 30 of the new assignment to rewrite the contract information of the eSIM so as to cause the shared number to be released from the terminal device of the original assignment and to be assigned to the terminal device of the new assignment.

As a result, the shared number assignment can be switched by considering a state of the terminal device of the original assignment and the terminal device of the new assignment (i.e., whether the mobile device is engaged in call or the like). Thus, safety and utility are achieved while contracts to communicate through a telephone network can be used effectively.

Additionally, an environment to use the mobile devices 30 which supports a new work style such as Work Style Reform and work sharing can be provided.

In the following, a second embodiment will be described. The different points from the first embodiment will be described in the second embodiment. The second embodiment may be the same as or similar to the first embodiment about points which are not described specifically.

Figure 10:
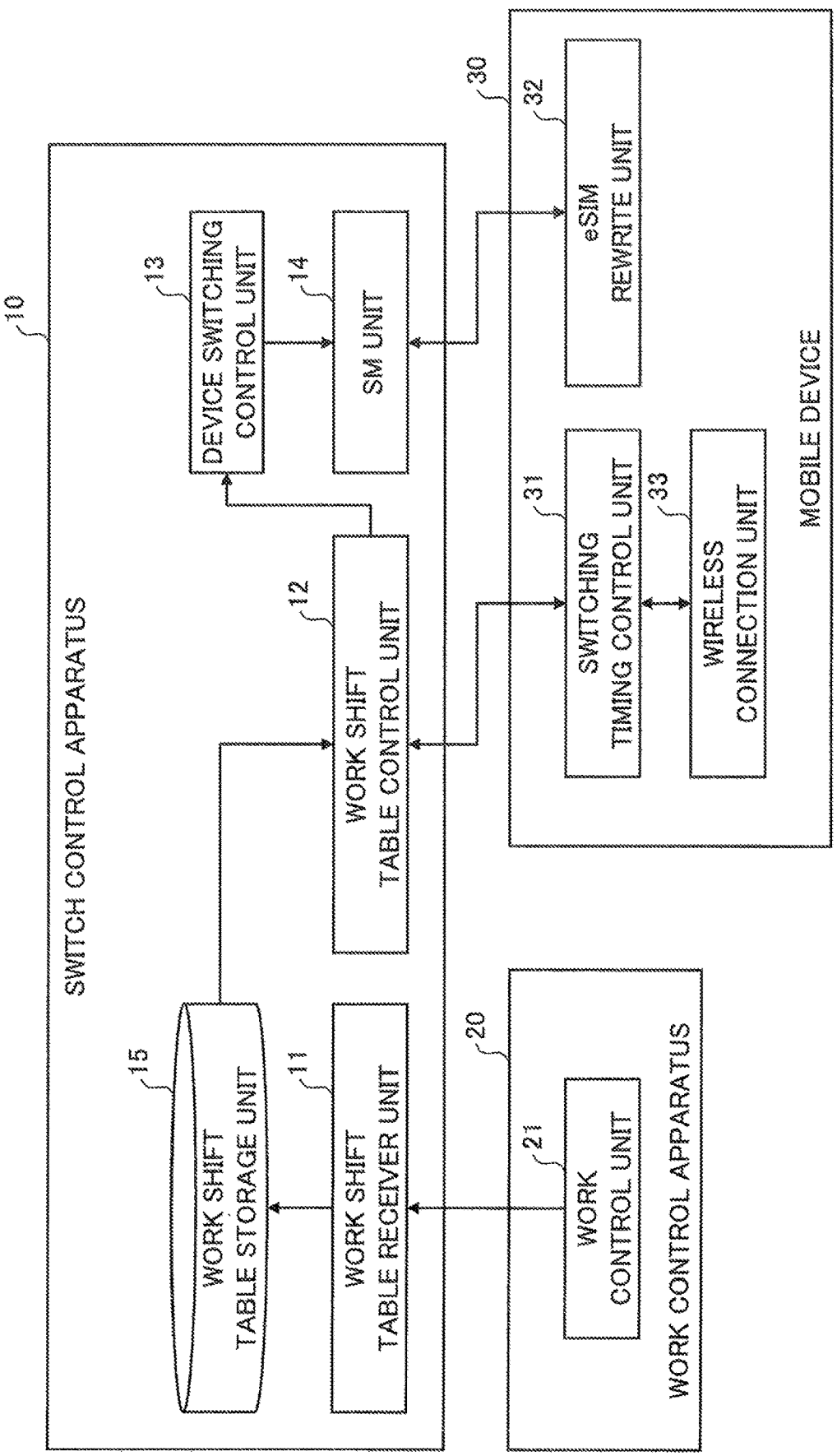
FIG. 10 is a drawing illustrating an example of the functional configuration of a switching control system according to a second embodiment.

FIG. 10 is a drawing illustrating an example of the functional configuration of a switching control system according to the second embodiment. In FIG. 10, the same reference numerals are used for the same components of FIG. 5 and explanations are not repeated.

In FIG. 10, the mobile device 30 further includes a wireless connection unit 33. The wireless connection unit 33 is implemented by the process of one or more programs, installed in the mobile device 30, executed by the CPU 301 in the mobile device 30.

The wireless connection unit 33 checks whether another mobile device 30 (specifically, the mobile device 30 to which the shared number of this mobile device 30 is assigned or from which the shared number is released and assigned to this mobile device 30) is located nearby through a direct peer-to-peer wireless connection. Bluetooth (registered mark), Wi-Fi (registered trademark) direct or the like may be used for a wireless connection. The direct wireless connection is a wireless connection without routing through a relaying device such as a base station and a router. Thus, a coverage area where the wireless connection unit 33 can connect is limited to a nearby area where radio waves of the wireless connection can reach.

Figure 11:
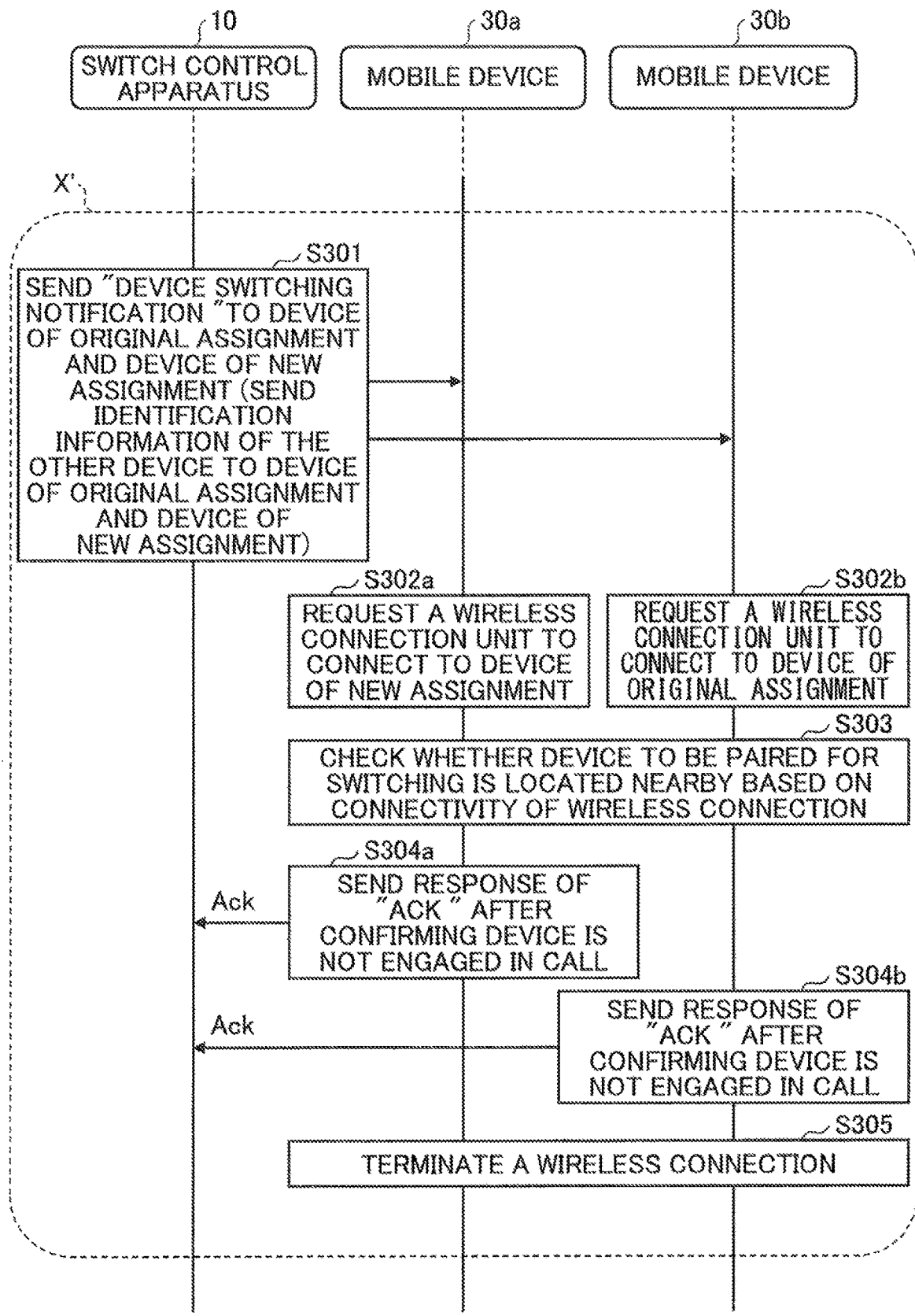
FIG. 11 is a sequence diagram describing an example of an assignment switching control process according to the second embodiment.

In the second embodiment, a procedure X in FIG. 8 is replaced with a procedure X' in FIG. 11. FIG. 11 is a sequence diagram describing an example of an assignment switching control process according to the second embodiment.

The work shift table control unit 12 waits until the switching time of the shared number assignment comes for each shift work group ID of the work shift table T1. According to the example in FIG. 7, when 12:00 comes, the work shift table control unit 12 sends the terminal device switching notification to the mobile device 30a to which the shared number has been assigned (i.e., the mobile device from which the shared number assignment is switched) and the mobile device 30b to which the shared number will be assigned (i.e., the mobile device to which the shared number assignment is switched) in step S301. At this step, the work shift table control unit 12 adds wireless connection identification of the other mobile device (i.e., the terminal device to be paired for switching) (this identification will hereinafter be referred to as the connection ID) in the terminal device switching notification to each mobile device 30 of the original assignment and the new assignment. In other words, the terminal device switching notification to the mobile device 30a includes the connection ID of the mobile device 30b. The terminal device switching notification to the mobile device 30b includes the connection ID of the mobile device 30a. The connection ID may be a MAC address when Bluetooth (registered trademark) is used for a wireless connection, and may be an SSID (Service Set Identifier) when Wi-Fi (registered trademark) direct is used for a wireless connection. Alternatively, the work control apparatus 20 may send the connection ID of each mobile device 30 with the work shift table T1 to the switching control apparatus 10 in advance, for example.

In step S302a and step S302b, each switching timing control unit 31 of the mobile device 30a and the mobile device 30b requests its own wireless connection unit 33 to connect to the terminal device to be paired for switching when each switching timing control unit 31 receives the terminal device switching notification. At this time, each switching timing control unit 31 sends the connection ID included in the terminal device switching notification to its own wireless connection unit 33.

In step S303, each wireless connection unit 33 of the mobile device 30a and the mobile device 30b checks whether the mobile device 30 to be paired for switching is located nearby (i.e., within a short distance) based on connectivity by the connection ID through a wireless connection, and outputs the result to its switching timing control unit 31. In other words, if the mobile device 30b to which the shared number is assigned is ready for next rotation of the shift work, the mobile device 30b is expected to be in a place for the shift work (e.g., an operation center) where the mobile device 30a is. This state is confirmed in step S303.

Each switching timing control unit 31 of the mobile devices 30 performs step S304a or S304b when the result of each wireless connection unit 33 indicates that the switching counterpart is located nearby. Otherwise, step S304a and S304b are not performed.

In step S304a or S304b, the switching timing control unit 31 of the mobile device 30 from which the shared number is switched or the mobile device 30 to which the shared number is switched checks whether its own mobile device 30 is not engaged in a call, and sends a response indicating that the shared number can be switched (i.e., Ack) to the switching control apparatus 10 when not engaged in a call. In other words, when the mobile device 30 is engaged in a call, the switching timing control unit 31 of the mobile device 30 does not send an Ack. However, when the mobile device 30 is engaged in a call, the switching timing control unit 31 of the mobile device 30 may wait for the end of a call and send an Ack after the end of a call. In this case, a maximum value of waiting time may be defined.

In step S305, the wireless connection unit 33 of each mobile device 30 terminates a wireless connection.

Subsequently, the processes in step S211 and onward in FIG. 8 are performed.

As described above, according to the second embodiment, the assignment of the shared number is switched when the mobile device 30 of the new assignment is located near the mobile device 30 of original assignment. Thus, for example, the shared number is used among the mobile devices 30 for work in a predetermined place, and the assignment of the shared number can be switched after confirming that the mobile device 30 of the new assignment is ready.

In the following, a third embodiment will be described. The different points from the first embodiment will be described in the third embodiment. The third embodiment may be the same as or similar to the first embodiment about points which are not described specifically.

Figure 12:
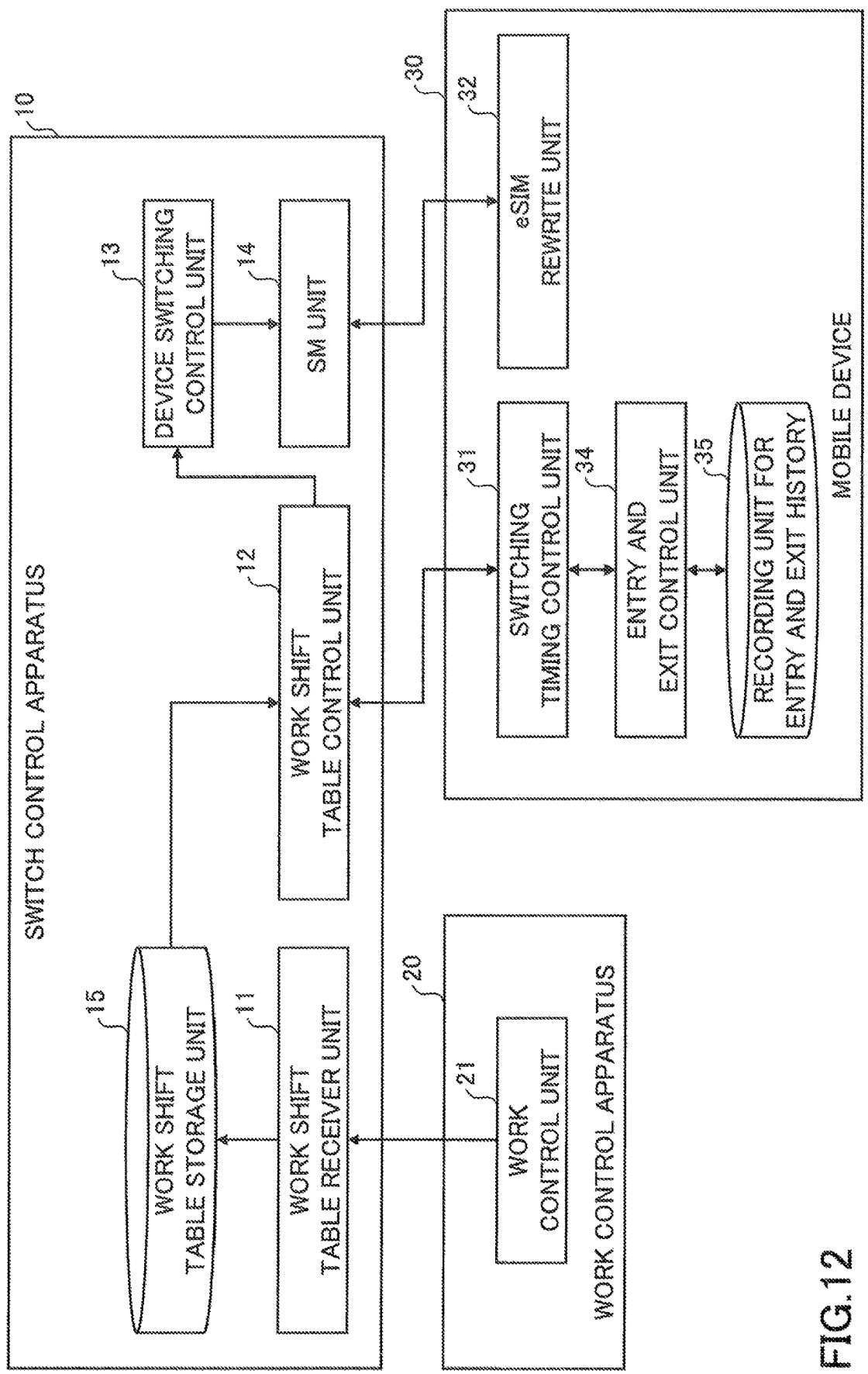
FIG. 12 is a drawing illustrating an example of the functional configuration of a switching control system according to a third embodiment.

FIG. 12 is a drawing illustrating an example of the functional configuration of a switching control system according to the third embodiment. In FIG. 12, the same reference numerals are used for the same components of FIG. 5 and explanations are not repeated.

The mobile device 30 in FIG. 12 further includes an entry and exit control unit 34 and a recording unit for entry and exit history 35. The entry and exit control unit 34 is implemented by the process of one or more programs, installed in the mobile device 30, executed by the CPU 301 in the mobile device 30. The recording unit for entry and exit history 35 can be achieved by using the auxiliary storage device 303 of the mobile device 30, for example.

The entry and exit control unit 34 detects an entry and exit of a certain place such as a room for the shift work (which will hereinafter be referred to as the work room) with the NFC device 307, and stores the result in the recording unit for entry and exit history 35. For example, by holding the mobile device 30 close to an NFC apparatus for an entry located outside the work room, the NFC device 307 of the mobile device 30 communicates with the NFC apparatus and the entry and exit control unit 34 stores entry information linked to the current date and time in the recording unit for entry and exit history 35. And by holding the mobile device 30 close to an NFC apparatus for an exit located inside the work room, the NFC device 307 of the mobile device 30 communicates with the NFC apparatus and the entry and exit control unit 34 stores exit information linked to the current date and time in the recording unit for entry and exit history 35. Consequently, a record of an entry and exit of the work room is stored in the recording unit for entry and exit history 35. Alternatively, each mobile device 30 user (i.e., each employee) may use a different work room. For example, a work room of Employee A may be located in a different place from a work room of Employee B.

Figure 13:
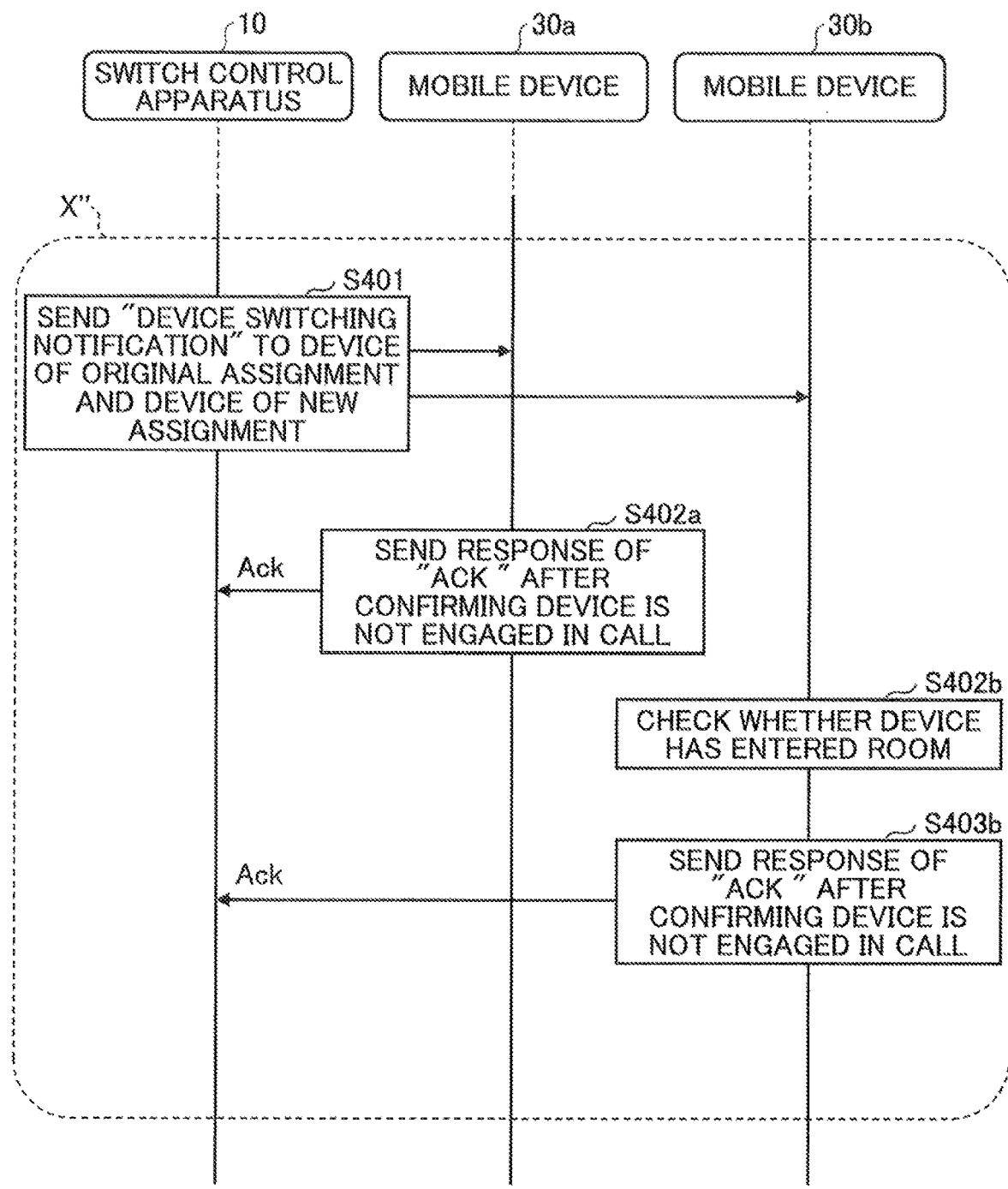
FIG. 13 is a sequence diagram describing an example of an assignment switching control process according to the third embodiment.

In the third embodiment, a procedure X in FIG. 8 is replaced with a procedure X" in FIG. 13. FIG. 13 is a sequence diagram describing an example of an assignment switching control process according to the third embodiment.

The work shift table control unit 12 waits until, the switching time of the shared number assignment comes for each shift work group ID of the work shift table T1. According to the example in FIG. 7, when 12:00 comes, the work shift table control unit 12 sends the terminal device switching notification to the mobile device 30a to which the shared number has been assigned (i.e., the mobile device from which the shared number assignment is switched) and the mobile device 30b to which the shared number will be assigned (i.e., the mobile device 30 to which the shared number assignment is switched) in step S401.

In step S402a, the switching timing control unit 31 of the mobile device 30a checks that the mobile device 30a is not engaged in a call, and sends a response indicating that the shared number can be switched (i.e., Ack) to the switching control apparatus 10 when the mobile device 30a is not engaged in a call. In other words, when the mobile device 30a is engaged in a call, the switching timing control unit 31 of the mobile device 30a does not send an Ack. However, the switching timing control unit 31 of the mobile device 30a may wait for the end of a call as described in the second embodiment.

In step S402b, the switching timing control unit 31 of the mobile device 30b checks whether the mobile device 30b has already entered the work room (i.e., whether the mobile device 30b is located in the work room) by referring to the recording unit for entry and exit history 35 when the switching timing control unit 31 of the mobile device 30b receives the terminal device switching notification.

FIG. 14 is a drawing illustrating an example of the configuration of the recording unit for entry and exit history 35. As illustrated in FIG. 14, sections indicating an entry or exit and the date and time are stored in the recording unit for entry and exit history 35 every time an entry into the work room or an exit from the work room occurs.

In step S402b, whether the section of a latest record is "Entry" is checked in the recording unit for entry and exit history 35. The switching timing control unit 31 of the mobile device 30b determines that the mobile device 30b has already entered the work room (or is located in the work room) if the section of the latest record is "Entry", and performs the process of step S403b. The switching timing control unit 31 of the mobile device 30b determines that the mobile device 30b does not enter the work room if the section of the latest record is "Exit", and does not perform the process of step S403b.

In step S403b, the switching timing control unit 31 of the mobile device 30b checks that the mobile device 30b is not engaged in a call, and sends a response indicating that the shared number can be switched (i.e., Ack) to the switching control apparatus 10 when the mobile device 30b is not engaged in a call. In other words, when the mobile device 30b is engaged in a call, the switching timing control unit 31 of the mobile device 30b does not send an Ack. However, the switching timing control unit 31 of the mobile device 30b may wait for the end of a call.

The example of determining whether the mobile device 30b has already entered the work room based on the entry and exit history is described above, however another method may be used to determine it. For example, the switching timing control unit 31 may determine that the mobile device 30b has already entered the work room if the mobile device 30b receives a radio wave which can be received in the work room (e.g., a radio wave of wireless LAN). Alternatively, the switching timing control unit 31 may determine that the mobile device 30b has already entered the work room based on location information measured by GPS (Global Positioning System) or the like.

As described above, according to the third embodiment, the assignment of the shared number can be switched when the mobile device 30b of the new assignment has already entered the work room. Consequently, the assignment of the shared number can be switched after confirming that the mobile device of the new assignment is ready.

In each embodiment described above, the switching control apparatus 10 is an example of a contract assignment switching apparatus. The work shift table control unit 12 is an example of a sender. The terminal device switching control unit 13 and the SM unit 14 are examples of a requester. The switching timing control unit. 31 is an example of a response sender. The switching control apparatus 10 and the mobile devices 30 are examples of a contract assignment switching system.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A contract assignment switching apparatus, comprising:
   a memory; and
   a processor coupled to the memory and configured to
   send a notification to switch an assignment of identification information corresponding to one contract for communication through a telephone network, at a switching time of the assignment of the identification information, to a first terminal device to which the identification information is assigned before the switching time and a second terminal device to which the identification information is assigned after the switching time; and request the first terminal device and the second terminal device to rewrite information with respect to the contract stored in the first terminal device and the second terminal device respectively so as to switch the assignment of the identification information from the first terminal device to the second terminal device in accordance with a response to the notification from each of the first terminal device and the second terminal device.

2. The contract assignment switching apparatus as claimed in claim 1, wherein each of the first terminal device and the second terminal device is configured to request rewriting the information stored in an eSIM.

3. A contract assignment switching system, comprising:
a contract assignment switching apparatus; and
a plurality of terminal devices including a first terminal device and a second terminal device to communicate through a telephone network,
wherein the contract assignment switching apparatus includes
a memory; and
a processor coupled to the memory and configured to
send a notification to switch an assignment of identification information corresponding to one contract for communication through the telephone network, at a switching time of the assignment of the identification information, to the first terminal device to which the identification information is assigned before the switching time and the second terminal device to which the identification information is assigned after the switching time of the plurality of devices; and
request the first terminal device and the second terminal device to rewrite information with respect to the contract stored in the first terminal device and the second terminal device respectively so as to switch the assignment of the identification information from the first terminal device to the second terminal device in accordance with a response to the notification from each of the first terminal device and the second terminal device.

4. The contract assignment switching system as claimed in claim 3, wherein a terminal device being one of the first terminal device and the second terminal device further comprises a response sender configured to send the response to the contract assignment switching apparatus in response to the terminal device receiving an input indicating that the assignment of identification information can be switched by asking a user of the terminal device whether the assignment of identification information can be switched, the terminal device having received the notification.

5. The contract assignment switching system as claimed in claim 3, wherein a terminal device being one of the first terminal device and the second terminal device further comprises a response sender configured to send the response to the assignment switching apparatus in response to the terminal device determining that the first terminal device and the second terminal device can communicate with each other through a wireless connection by checking a connectivity of the wireless connection, the terminal device having received the notification.

6. The contract assignment switching apparatus as claimed in claim 3, wherein the second terminal device further comprises a response sender configured to send the response to the assignment switching apparatus in response to the second terminal device being located in a predetermined place, the second terminal device having received the notification.

7. A contract assignment switching method executed by a computer, the method comprising:
sending a notification to switch an assignment of identification information corresponding to one contract for communication through a telephone network, at a switching time of the assignment of the identification information, to a first terminal device to which the identification information is assigned before the switching time and a second terminal device to which the identification information is assigned after the switching time; and
requesting the first terminal device and the second terminal device to rewrite information with respect to the contract stored in the first terminal device and the second terminal device respectively so as to switch the assignment of the identification information from the first terminal device to the second terminal device in accordance with a response to the notification from each of the first terminal device and the second terminal device.

8. The contract assignment switching method as claimed in claim 7, wherein each of the first terminal device and the second terminal device is configured to request rewriting the information stored in an eSIM.

* * * * *